United States Patent
Shetty (10) Patent No.: US 8,175,173 B2
(45) Date of Patent: *May 8, 2012

(54) METHODS AND SYSTEMS FOR TRANSMITTING SIGNALS DIFFERENTIALLY AND SINGLE-ENDEDLY ACROSS A PAIR OF WIRES

(75) Inventor: Naresh B. Shetty, Fremont, CA (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,722

(22) Filed: Apr. 20, 2011

(65) Prior Publication Data

US 2011/0194595 A1   Aug. 11, 2011

Related U.S. Application Data

(63) Continuation of application No. 11/601,070, filed on Nov. 17, 2006, now Pat. No. 7,953,162.

(51) Int. Cl.
*H04B 3/00* (2006.01)
(52) U.S. Cl. ......... 375/257; 370/318; 370/317; 370/311
(58) Field of Classification Search .................. 375/257
See application file for complete search history.

(56) References Cited

U.S. PATENT DOCUMENTS

| | | | | |
|---|---|---|---|---|
| 3,587,044 A * | 6/1971 | Jenkins | ......................... | 714/815 |
| 3,676,583 A * | 7/1972 | Morita et al. | ................. | 386/204 |
| 4,092,596 A * | 5/1978 | Dickinson et al. | ............ | 375/286 |
| 4,445,048 A * | 4/1984 | Graham | .......................... | 307/42 |
| 4,486,739 A * | 12/1984 | Franaszek et al. | .............. | 341/59 |
| 4,527,079 A * | 7/1985 | Thompson | ....................... | 326/78 |
| 4,658,156 A * | 4/1987 | Hashimoto | ....................... | 327/51 |
| 4,803,638 A * | 2/1989 | Nottingham et al. | ........... | 702/36 |
| 4,818,896 A * | 4/1989 | Cavanna | ......................... | 326/90 |
| 4,853,560 A * | 8/1989 | Iwamura et al. | ................ | 326/80 |
| 5,016,269 A * | 5/1991 | Rogers | ....................... | 455/404.1 |
| 5,059,835 A * | 10/1991 | Lauffer et al. | ................. | 327/437 |
| 5,067,007 A * | 11/1991 | Otsuka et al. | ................. | 257/701 |
| 5,126,686 A * | 6/1992 | Tam | .............................. | 330/134 |
| 5,144,167 A * | 9/1992 | McClintock | .................... | 326/71 |
| 5,309,044 A * | 5/1994 | Wang | ............................ | 326/124 |
| RE34,808 E * | 12/1994 | Hsieh | ............................. | 326/71 |
| 5,422,760 A * | 6/1995 | Abbott et al. | ................... | 360/46 |
| 5,459,607 A * | 10/1995 | Fellows et al. | ................ | 398/154 |

(Continued)

OTHER PUBLICATIONS

"Low Voltage Differential Signalling," The International Engineering Consortium; Web ProForum Tutorials; http://www.iec.org/online/tutorials/acrobat/low_voltage.pdf, pp. 1-15 (at least as early as Oct. 2006).

(Continued)

*Primary Examiner* — Chieh M Fan
*Assistant Examiner* — Santiago Garcia
(74) *Attorney, Agent, or Firm* — Fliesler Meyer LLP (57) ABSTRACT

Provided herein are systems and methods for transmitting signals across a pair of wires. In accordance with specific embodiments, a differential signal is transmitted across the pair of wires during one period of time, and two single-ended signals are transmitted across the same pair of wires during another period of time. Low voltage differential signaling (LVDS) can be used to transmit the differential signal across the pair of wires. In contrast, non-differential signaling can be used to transfer the two singled-ended signals across the same pair of wires.

24 Claims, 5 Drawing Sheets

U.S. PATENT DOCUMENTS

| | | | | |
|---|---|---|---|---|
| 5,506,521 | A * | 4/1996 | Collins | 326/126 |
| 5,521,530 | A * | 5/1996 | Yao et al. | 326/80 |
| 5,557,219 | A * | 9/1996 | Norwood et al. | 326/49 |
| 5,589,783 | A * | 12/1996 | McClure | 326/71 |
| 5,689,195 | A * | 11/1997 | Cliff et al. | 326/41 |
| 5,715,274 | A * | 2/1998 | Rostoker et al. | 375/130 |
| 5,742,178 | A * | 4/1998 | Jenkins et al. | 326/33 |
| 5,742,798 | A * | 4/1998 | Goldrian | 713/400 |
| 5,801,548 | A * | 9/1998 | Lee et al. | 326/44 |
| 5,812,461 | A * | 9/1998 | Komarek et al. | 365/189.05 |
| 5,856,952 | A * | 1/1999 | Yoo et al. | 365/230.08 |
| 5,872,810 | A * | 2/1999 | Philips et al. | 375/222 |
| 5,872,811 | A * | 2/1999 | Gusinov | 375/257 |
| 5,912,920 | A * | 6/1999 | Marchok et al. | 375/219 |
| 5,936,423 | A * | 8/1999 | Sakuma et al. | 326/16 |
| 5,939,904 | A * | 8/1999 | Fetterman et al. | 327/67 |
| 5,949,253 | A * | 9/1999 | Bridgewater, Jr. | 326/86 |
| 5,958,026 | A * | 9/1999 | Goetting et al. | 710/52 |
| 5,970,255 | A * | 10/1999 | Tran et al. | 710/73 |
| 5,982,833 | A * | 11/1999 | Waters | 375/372 |
| 6,005,895 | A * | 12/1999 | Perino et al. | 375/288 |
| 6,130,563 | A * | 10/2000 | Pilling et al. | 327/111 |
| 6,134,214 | A * | 10/2000 | Takagi et al. | 369/47.14 |
| 6,175,952 | B1 * | 1/2001 | Patel et al. | 716/104 |
| 6,178,215 | B1 * | 1/2001 | Zhang et al. | 375/371 |
| 6,215,326 | B1 * | 4/2001 | Jefferson et al. | 326/41 |
| 6,222,388 | B1 * | 4/2001 | Bridgewater, Jr. | 326/86 |
| 6,226,356 | B1 * | 5/2001 | Brown | 379/24 |
| 6,229,336 | B1 * | 5/2001 | Felton et al. | 326/38 |
| 6,236,231 | B1 * | 5/2001 | Nguyen et al. | 326/39 |
| 6,243,776 | B1 * | 6/2001 | Lattimore et al. | 710/104 |
| 6,252,419 | B1 * | 6/2001 | Sung et al. | 326/38 |
| 6,256,235 | B1 * | 7/2001 | Lee | 365/189.11 |
| 6,256,689 | B1 * | 7/2001 | Khosrowpour | 710/300 |
| 6,271,679 | B1 * | 8/2001 | McClintock et al. | 326/38 |
| 6,281,715 | B1 * | 8/2001 | DeClue et al. | 327/65 |
| 6,282,045 | B1 * | 8/2001 | Glover | 360/73.03 |
| 6,288,581 | B1 * | 9/2001 | Wong | 327/108 |
| 6,294,924 | B1 * | 9/2001 | Ang et al. | 326/30 |
| 6,313,682 | B1 * | 11/2001 | Muller et al. | 327/108 |
| 6,323,687 | B1 * | 11/2001 | Yano | 326/83 |
| 6,346,832 | B1 * | 2/2002 | Young | 327/108 |
| 6,366,128 | B1 * | 4/2002 | Ghia et al. | 326/83 |
| 6,377,076 | B1 * | 4/2002 | Gauthier | 326/86 |
| 6,389,069 | B1 * | 5/2002 | Mathe | 375/232 |
| 6,400,598 | B1 * | 6/2002 | Nguyen et al. | 365/63 |
| 6,407,576 | B1 * | 6/2002 | Ngai et al. | 326/41 |
| 6,433,579 | B1 * | 8/2002 | Wang et al. | 326/38 |
| 6,437,599 | B1 * | 8/2002 | Groen | 326/63 |
| 6,448,813 | B2 * | 9/2002 | Garlepp et al. | 326/83 |
| 6,453,374 | B1 * | 9/2002 | Kovalan et al. | 710/100 |
| 6,515,508 | B1 * | 2/2003 | Chang et al. | 326/38 |
| 6,580,930 | B1 * | 6/2003 | Fulghum et al. | 455/574 |
| 6,639,434 | B1 * | 10/2003 | Rahman | 327/108 |
| 6,650,140 | B2 * | 11/2003 | Lee et al. | 326/39 |
| 6,650,141 | B2 * | 11/2003 | Agrawal et al. | 326/41 |
| 6,683,472 | B2 * | 1/2004 | Best et al. | 326/30 |
| 6,686,772 | B2 * | 2/2004 | Li et al. | 326/83 |
| 6,687,775 | B1 * | 2/2004 | Bassett | 710/70 |
| 6,700,403 | B1 * | 3/2004 | Dillon | 326/37 |
| 6,762,625 | B1 * | 7/2004 | Devnath | 326/115 |
| 6,788,116 | B1 * | 9/2004 | Cook et al. | 327/108 |
| 6,810,216 | B1 * | 10/2004 | Tourunen | 398/202 |
| 6,812,733 | B1 * | 11/2004 | Plasterer et al. | 326/30 |
| 6,856,178 | B1 * | 2/2005 | Narayan | 327/108 |
| 6,861,868 | B1 * | 3/2005 | Agrawal et al. | 326/38 |
| 7,109,743 | B2 * | 9/2006 | Shumarayev et al. | 326/26 |
| 7,129,739 | B2 * | 10/2006 | Best et al. | 326/30 |
| 7,154,302 | B2 * | 12/2006 | Best et al. | 326/86 |
| 7,215,891 | B1 * | 5/2007 | Chiang et al. | 398/137 |
| 7,279,982 | B1 * | 10/2007 | Zhou et al. | 330/301 |
| 7,522,670 | B2 * | 4/2009 | Carballo et al. | 375/257 |
| 2002/0057101 | A1 * | 5/2002 | Tang et al. | 326/29 |
| 2002/0101913 | A1 * | 8/2002 | Masters et al. | 375/219 |
| 2002/0135404 | A1 * | 9/2002 | Payne et al. | 327/108 |
| 2002/0180480 | A1 * | 12/2002 | Dreps et al. | 326/62 |
| 2002/0186048 | A1 * | 12/2002 | Tang et al. | 326/86 |
| 2003/0141919 | A1 * | 7/2003 | Wang et al. | 327/390 |
| 2004/0000924 | A1 * | 1/2004 | Best et al. | 326/30 |
| 2004/0022311 | A1 * | 2/2004 | Zerbe et al. | 375/229 |
| 2004/0032282 | A1 * | 2/2004 | Lee et al. | 326/39 |
| 2004/0051555 | A1 * | 3/2004 | Wilcox et al. | 326/30 |
| 2004/0051565 | A1 * | 3/2004 | Dreps et al. | 327/65 |
| 2004/0169434 | A1 * | 9/2004 | Washington et al. | 310/232 |
| 2004/0203477 | A1 * | 10/2004 | Carballo et al. | 455/69 |
| 2004/0203483 | A1 * | 10/2004 | Carballo et al. | 455/88 |
| 2005/0104619 | A1 * | 5/2005 | Best et al. | 326/30 |
| 2005/0119025 | A1 * | 6/2005 | Mohindra et al. | 455/552.1 |
| 2005/0212553 | A1 * | 9/2005 | Best et al. | 326/30 |
| 2005/0237082 | A1 * | 10/2005 | Shumarayev et al. | 326/26 |
| 2005/0240386 | A1 * | 10/2005 | Carballo et al. | 703/14 |
| 2006/0017462 | A1 * | 1/2006 | Kao | 326/62 |
| 2006/0171477 | A1 * | 8/2006 | Carballo et al. | 375/257 |
| 2006/0187968 | A1 * | 8/2006 | Spooner | 370/503 |
| 2006/0220703 | A1 * | 10/2006 | Wang et al. | 327/108 |
| 2008/0117994 | A1 * | 5/2008 | Shetty | 375/257 |
| 2008/0148063 | A1 * | 6/2008 | Hanko et al. | 713/189 |

OTHER PUBLICATIONS

"Understanding LVDS for Digital Test Systems," National Instruments; http://zone.ni.com/devzone/cda/tut/p/id/4441; (at least as early as Oct. 2006).

International Search Report and Written Opinion for PCT/US2007/079715, dated Jun. 2, 2008.

* cited by examiner

METHODS AND SYSTEMS FOR TRANSMITTING SIGNALS DIFFERENTIALLY AND SINGLE-ENDEDLY ACROSS A PAIR OF WIRES

PRIORITY CLAIM

This application is a continuation of U.S. patent application Ser. No. 11/601,070, entitled "USE OF DIFFERENTIAL PAIR AS SINGLE-ENDED DATA PATHS TO TRANSPORT LOW SPEED DATA," filed Nov. 17, 2006, which is incorporated herein by reference.

FIELD OF THE INVENTION

Embodiments of the present invention relate to the transmission and reception of both high speed and low speed serial data signals. Embodiments of the present invention also relate to the transmission and reception of both differential and single-ended signals.

BACKGROUND

Today, high speed signals such as video signals are typically sent from a source (e.g., host processor) to a sink (e.g., a display driver) using numerous single-ended signal paths along with a clock source. However, as the data rates increase, traditional complementary symmetry metal oxide semiconductor/transistor transistor logic (CMOS/TTL) signaling is prone to electromagnetic interference (EMI) related problems. In addition, as the amount of data from source to sink increases (e.g., as resolution of displays increase), the number of signals from the source to sink also increase, which results in increased power consumption to transport faster and wider signals from a source to a sink. This is undesirable, especially in portable devices. Accordingly, there is a need to reduce the power consumption that results from high speed signals being sent from sources to sinks

SUMMARY OF THE INVENTION

Embodiments of the present invention relate to systems and methods for transmitting signals across a pair of wires. In accordance with specific embodiments, a differential signal is transmitted across the pair of wires during one period of time, and two single-ended signals are transmitted across the same pair of wires during another period of time. Low voltage differential signaling (LVDS) can be used to transmit the differential signal across the pair of wires. In contrast, non-differential signaling can be used to transfer the two singled ended signals across the same pair of wires. Such pair of wires can be, e.g., a twisted pair, or a pair of conductive traces, but are not limited thereto.

Embodiments of the present invention can be used, e.g., to reduce power consumption in a mobile device that has an active mode and a sleep or standby mode. In accordance with specific embodiments, the LVDS is performed when a device is in an active mode, and the non-differential signaling is used when the device is in a sleep or standby mode. Stated another way, the pair of wires can be used as a single differential pair, when the device is in a first mode (e.g., active mode), and the same pair of wires can be used as two separate serial lines (e.g., I2C type SDA and SCL lines), when the device is in the second mode (e.g., sleep or standby mode).

In accordance with specific embodiments of the present invention, a system includes a transmitter having a pair of outputs, and a receiver having a pair of inputs. The pair of outputs of the transmitter are configured to be connected, by a pair of wires, to the two inputs of the receiver. The transmitter, when in a first mode (e.g., active mode), outputs a differential signal at the two outputs to transmit across the two wires to the two inputs of the receiver. In contrast, when the transmitter is in a second mode (e.g., sleep or standby mode), the transmitter outputs two single-ended signals, one at each of the two outputs, to transmit across the same two wires to the two inputs of the receiver.

In accordance with specific embodiments, the receiver can also be in the first mode and the second mode. The receiver can treat signals received at its two inputs as a differential signal, when the receiver is in the first mode; and the receiver can treat signals received at its two inputs as single-ended signals when the receiver is in the second mode.

In accordance with specific embodiments, the transmitter and receiver each include a pair of switches that are used to specify whether I2C signals are to be transmitted as either an embedded portion of a differential signal across the pair of wires, or as two separate single-ended signals across the same pair of wires.

Further embodiments, and the features, aspects, and advantages of the present invention will become more apparent from the detailed description set forth below, the drawings and the claims.

DETAILED DESCRIPTION

Various signals need to be sent from a source to a sink, e.g., when the source is a host processor and the sink is a display driver. Such signals can include RGB signals, horizontal and vertical synchronization signals (HSYNC and VSYNC), a processor clock signal (PCLKIN), a data enable signal (DATAEN) and a reset/power down signal (RESET/PWRDN). Also, additional low speed control signals, such as Inter-Integrated Circuit (I2C) signals, may also need to be sent. An example of this is shown in FIG. 1, described below.

Figure 1:
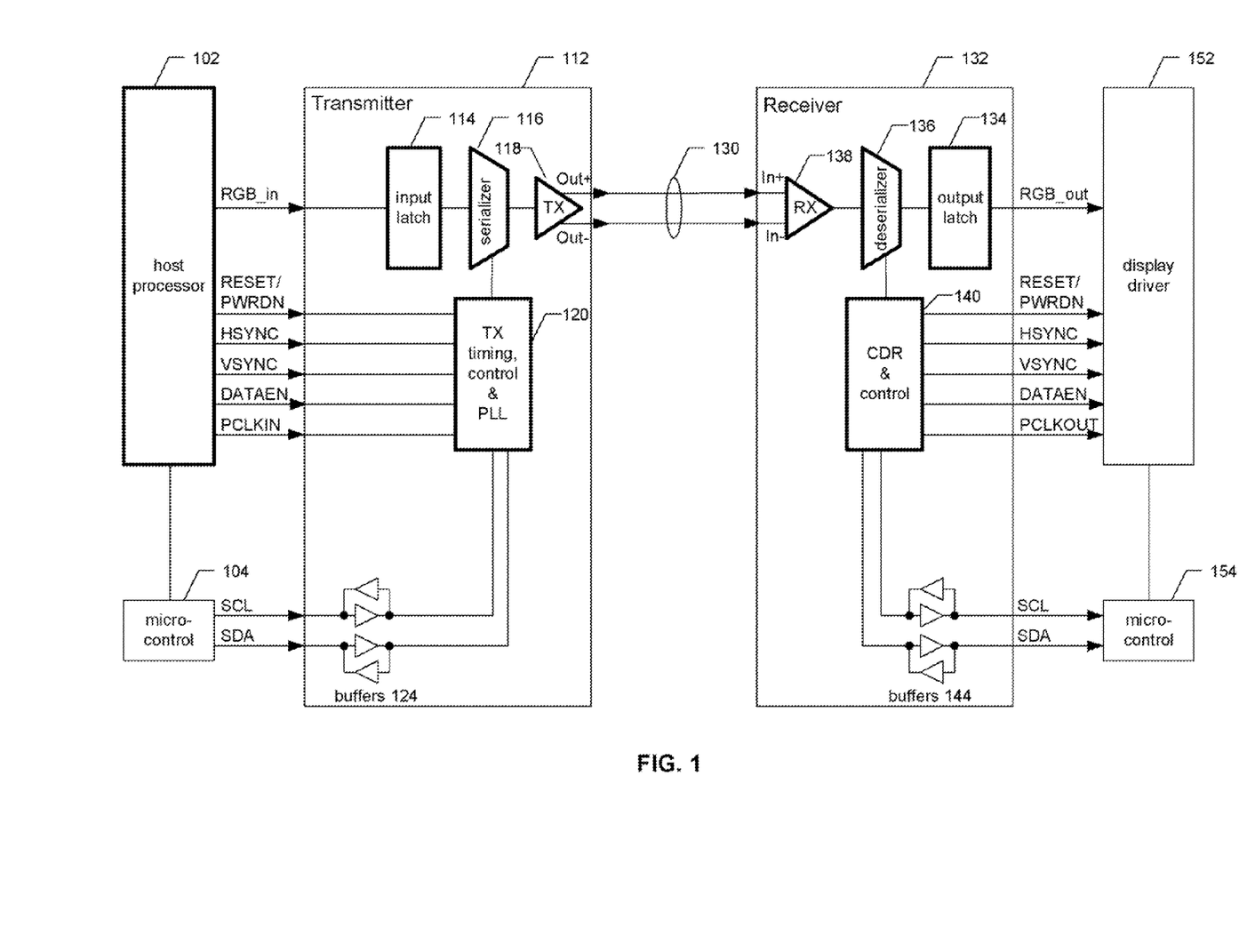
FIG. 1 is a high level block diagram which is useful for explaining one scheme for transferring both high speed and low speed signals between a transmitter and a receiver.

FIG. 1 shows a transmitter 112 and a receiver 132 that are used to send video signals from a host processor 102 (also referred to simply as a host) to a display driver 152. The display driver 152, which likely includes column and row drivers, drives a display (not shown), such as a liquid crystal display (LCD) of a mobile phone, camera, or other mobile device.

The transmitter 112 is shown as including an input latch 114, a serializer 116, an output stage 118 and a timing, control and phase locked loop (PLL) block 120. The receiver 132 is shown as including an input stage 138, a deserializer 136, an output latch 134, as well as a clock and data recovery (CDR) and control block 140.

The host is shown as providing RGB, RESET/PWRDN, HSYNC, VSYNC, DATAEN and PCLKIN signals to the transmitter 112, so that the transmitter 112 can send such signals, or other signals indicative of such signals, to the receiver 132. Additionally, lower speed I2C signals, including serial clock (SCL) and serial data (SDA) signals are provided to the transmitter 112 for sending to the receiver 132. The SCL and SDA signals are shown as being generated by a micro-controller 104 that is in communication with the host 102, but instead can be generated by the host 102 or some other component. While a further micro-controller 154 is shown as receiving the SCL and SDA signals, such signals can instead be provided to the display driver 152 or some other component.

A pair of wires 130 connect the output stage 118 of the transmitter 112 to the input stage 138 of the receiver 132. The serializer 116 and output stage 118 together with the input stage 138 and deserializer 136 enable the use of a low voltage differential signaling (LVDS) based serialization and deserialization (SERDES) scheme to be used to send data across the pair of wires 130 in a fast and power efficient manner that avoids EMI problems. Additionally, the CDR circuit 140 is used to eliminate the need to send separate clock signal(s) on separate wire(s).

The serializer 116 converts the parallel RGB bits, received via the input latch 114, to a serial signal. Additionally, the serializer 116 embeds the RESET/PWRDN, HSYNC, VSYNC, DATAEN and PCKLIN signals, or signals representative thereof, into the serial signal. Also, in the embodiment shown in FIG. 1, the serializer 116 also embeds the SCL and SDA signals, or signals representative thereof, into the serial signal. The serializer uses a time multiplexing scheme to embed the various signals into the serial signal.

To provide for low power and high speed communication, low voltage differential signaling (LVDS) is used to send the serial data signal from the transmitter 112 to the receiver 132. To accomplish this, the output stage 118 converts the single-ended serial data signal output by the serializer 116 into a differential signal with low voltage swings, in a well known manner. In addition to providing for low power and high speed communication, this transmission scheme provides for good common-mode rejection and noise immunity. Because of its operation, the output stage 118 can also be referred to as a LVDS transmitter 118. LVDS provides for transmission in the GHz range, or at least the MHs range. In contrast, I2C provides for transmission in the 100-400 KHz range.

The high speed differential signals are sent from the transmitter 112 to the receiver 132 across the pair of wires 130. Such wires 130 can be a twisted-pair, but need not be. Further, since the term "wire" as used herein refers to a conductive signal path, the pair of wires 130 can be a pair of conductive traces.

The input stage 138 converts the LVDS differential signal received across the pair of wires 130 to a single-ended serial digital signal. Because of its operation, the input stage 138 can also be referred to as a LVDS receiver. The deserializer 136 receives the single-ended serial signal, from the output of the input stage 138, and provides parallel RGB bits to the output latch 134. The deserializer 136 also provides the RESET/PWRDN, HSYNC, VSYNC, DATAEN and PCKLIN signals, or signals representative thereof, to the CDR and control block 140. The CDR and control block 140 recovers the clock signal(s), and provides RESET/PWRDN, HSYNC, VSYNC, DATAEN and PCKLOUT signals to the display driver 152. Additionally, in this embodiment, the deserializer 136 de-embeds the SCL and SDA signals, or signals representative thereof, and the CDR and control block 140 provides those signals to the micro-controller 154, or to the display driver 152 or some other component. The deserializer 136 uses time de-multiplexing to separate out all the various signals that were combined by the serializer 116 into a serial signal.

Presuming the components shown in FIG. 1 are within a mobile device, such as a cell phone or camera, it is likely that the device would be in sleep mode or standby mode a majority (e.g., 80%) of the time, to preserve the device's battery life. While in sleep or standby mode, it is preferably to have as many components as possible inactive, so that they are not drawing power. For example, while the transmitter 112 is in sleep or standby mode, it may be desired that all components involved in high speed communications be inactive, including the input latch 114, the serializer 116, the LVDS transmitter 118 and the timing, control and PLL block 120 (all shown in heavy lines in the FIGS.). Nevertheless, even during sleep mode there is often still a need to send low speed data signals, such as the I2C signals (SCL and SDA), e.g., from the micro-controller 104 to the micro-controller 154. For this reason, the embodiment of FIG. 1 is power inefficient, because at least the timing, control and PLL block 120, serializer 116, output stage 118 of the transmitter, and the input stage 138, deserializer 136 and CDR and control block 140 of the receiver, would still need to be powered to enable the low speed (e.g., SCL and SDA) lines to be transmitted. This can result, e.g., in exercising a circuit at 25 MHz to transport a 100 KHz control signal, which is not an efficient scheme.

Figure 2:
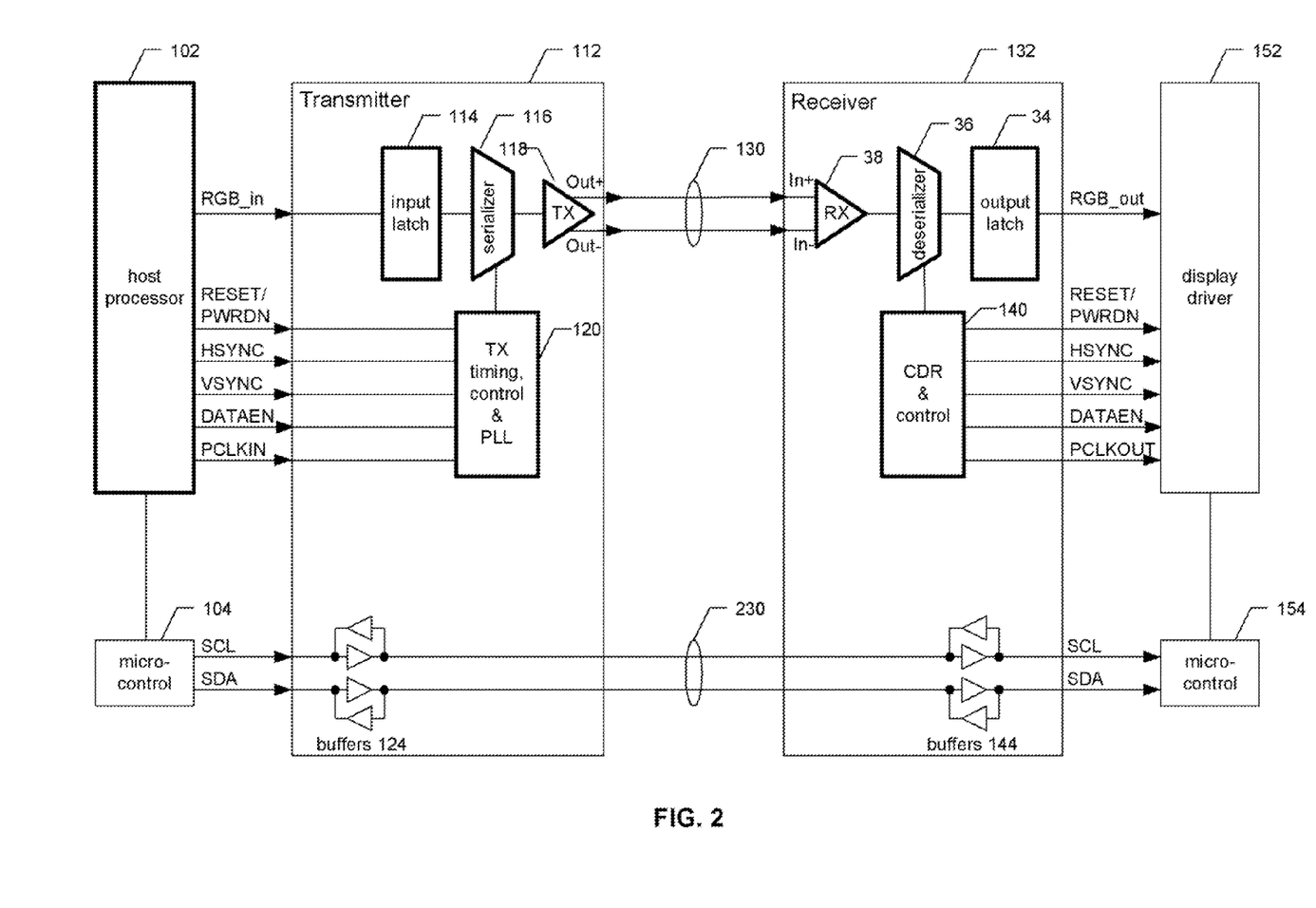
FIG. 2 is a high level block diagram which is useful for explaining an alternative scheme for transferring both high speed and low speed signals between a transmitter and a receiver. The scheme of FIG. 2 allows for less power consumption than the scheme of FIG. 1, but requires more wires between the transmitter and receiver.

As shown in FIG. 2, one way to avoid the just mentioned power inefficiency problem would be to provide two additional wires 230 between the transmitter 112 and the receiver 132, with the additional wires 230 being dedicated to transferring the low speed (e.g., I2C) signals. However, this is not preferred, as it is desirable to not increase the number of wires between components. Embodiments of the present invention, as described below with reference to FIG. 3, provide for a more eloquent solution that does not increase the number of wires between the transmitter 112 and the receiver 132.

Figure 3:
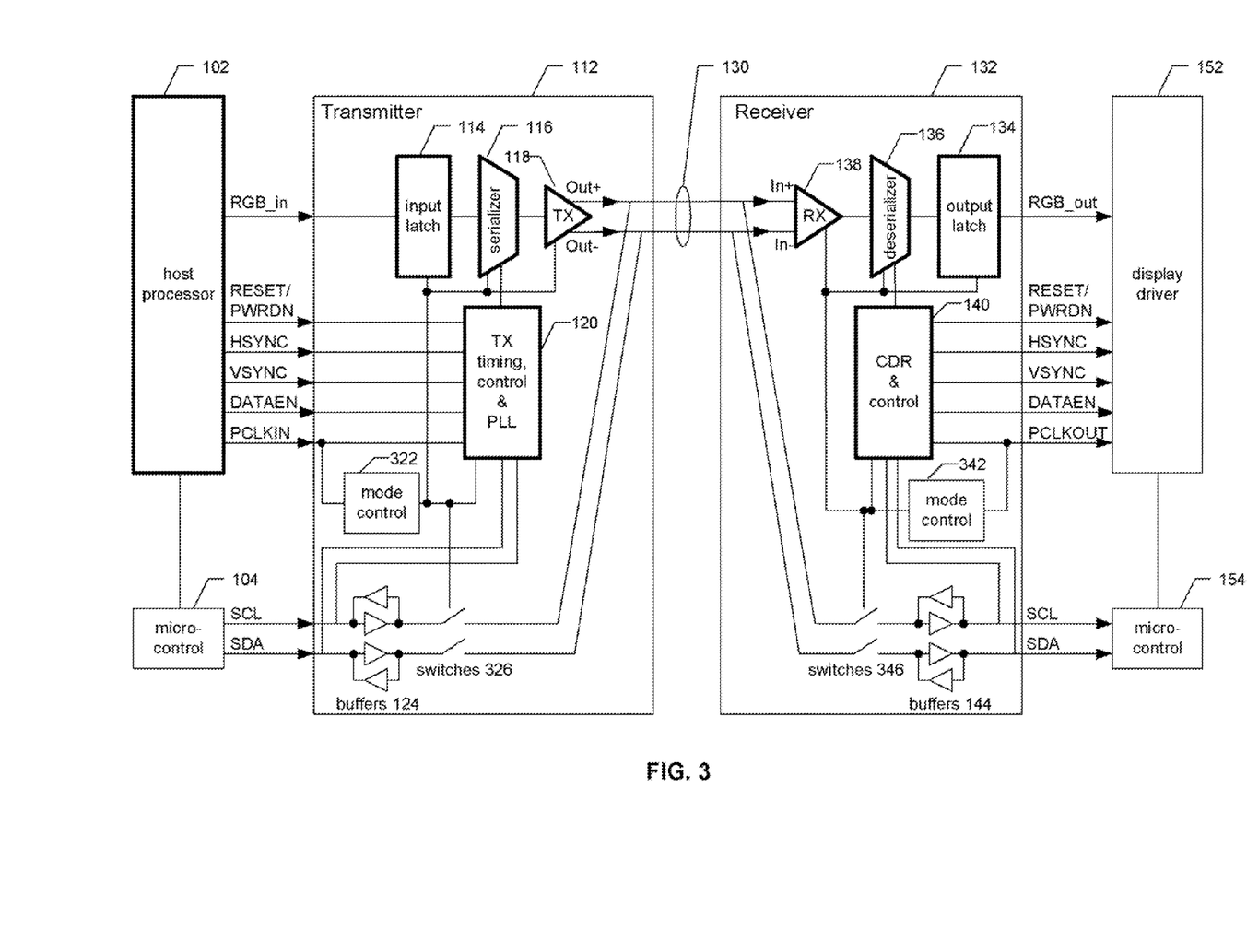
FIG. 3 is a high level block diagram which is useful for explaining embodiments of the present invention that can be used to reduce power consumption without increasing the number of wires between a transmitter and a receiver.

Referring to FIG. 3, a pair of switches 326 are added within the transmitter 112 and a pair of switches 346 are added within the receiver 132, for reasons that will be described below. Alternatively, but less preferably, such switches 326 and 346 can be external to the transmitter 112 and receiver 132. In accordance with an embodiment, switches 326 and 346 are analog switches implemented using transistors.

In accordance with an embodiment, the switches 326 and 346 are open (i.e., off) when there is a need to send high speed signals between the transmitter 112 and the receiver 132, e.g., when the host is providing high speed RGB, RESET/PWRDN, HSYNC, VSYNC, DATAEN and PCKLIN signals as an embedded LVDS signal to the transmitter 112. When the switches 326 and 346 are open (i.e., off), the low speed control signals (e.g., SCL and SDA) are also embedded by the transmitter 112 into the LVDS signal that is sent across the pair of wires 130, and the receiver 132 de-embeds such low speed control signals, in the same manner as was described above with reference to FIG. 1. However, when there is no need to send high speed signals between the transmitter 112 and receiver 132, e.g., when the host is not providing RGB, RESET/PWRDN, HSYNC, VSYNC, DATAEN and PCK-LIN signals to the transmitter 112, the switches 326 and 346 are closed (i.e., turned on). Additionally, when there is no need to send high speed signals between the transmitter 112 and receiver 132, the transmitter 112 and receiver 132 can be placed in sleep or standby mode, allowing all (or at least some) of the components (shown in heavy lines) involved in high speed communications to be inactive. In the transmitter 112, the components that can be inactive (and thus generally consuming only transistor leakage power) during sleep or standby mode include the input latch 114, the serializer 116, the output stage 118 and the timing, control and PLL block 120. The host 102 may also be inactive, or at least in a lower power mode. In the receiver 132, the components that can be inactive during sleep or standby mode include the input stage 138, the deserializer 136, the output latch 134 and the CDR and control block 140.

A mode controller 322 within the transmitter 112 and a mode controller 342 within the receiver 132 can be used to detect when it is appropriate for the transmitter 112 and the receiver 132 to be in a sleep or standby mode, as opposed to an active mode. As the terms are generally used herein the terms "sleep" and "standby" are used to identify power saving modes where certain components are fully or at least partially inactive. However, it should be noted that it is also possible that there can be more than one selectable power saving mode, e.g., where one mode saves more power than another.

There are various ways in which the mode controllers 322 and 342 can determine when to cause the transmitter 112 and receiver 132 to go into a sleep or standby mode, or more generally, into a reduced power mode. For example, the mode controller 322 can monitor the PCLKIN signal, and the mode controller 342 can monitor the PCLKOUT signal, as shown in FIG. 3. In this manner, when the mode controller 322 does not detect the PCLKIN signal (e.g., for at least a specified period of time) the mode controller 322 can cause the transmitter 112 to go into sleep or standby mode. Similarly, when the mode controller 342 does not detect the PCLKOUT signal (e.g., for at least a specified period of time) the mode controller 342 can cause the receiver 132 to go into sleep or standby mode. It is also possible that alternative signals, such as the DATAEN signal, be monitored for determining when to switch between sleep or standby mode and active mode. In other words, the mode controllers 322 and 342 can monitor the presence or absence of a signal to know when the transmitter 112 and receiver 132 should be in a sleep/standby mode, or in active mode.

As shown in FIG. 3, the mode controller 322 can also be used to control the switches 326, and the mode controller 342 can also be used to control the switches 346. More specifically, in accordance with an embodiment of the present invention, the mode controller 322 closes (i.e., turns on) the pair of switches 326 when the mode controller 322 causes the transmitter 112 to go into sleep or standby mode, and opens (i.e., turns off) the pair of switches 326 when the mode controller 322 causes the transmitter 112 to go back to active mode. Similarly, the mode controller 342 closes (i.e., turns on) the pair of switches 346 when the mode controller 132 causes the receiver 132 to go into sleep or standby mode, and opens (i.e., turns off) the pair of switches 346 when the mode controller 342 causes the receiver 132 to go back to active mode. The mode controllers 322 and 342 can be simple state machines or the like, as would be appreciated by one of ordinary skill in the art.

When the switches 326 and 346 are closed (i.e., turned on), the low speed signals (e.g., SCL and SDA) are transmitted from the transmitter 112 to the receiver 132 via the same pair of wires 130 that are used for high speed low voltage differential signaling (LVDS) when the transmitter 112 and receiver 132 are in active mode. However, when the pair of wires 130 are used for high speed LVDS (and the switches 326 and 346 are open), the pair of wires are used as a differential pair. In contrast, when the switches 326 and 346 are closed (i.e., turned on), the pair of wires 130 are used to transmit low speed signals, with the pair of wires being used as two separate single-ended serial lines, e.g., one which transmits an SCL signal, and the other which transmits an SDA signal.

Figure 4:
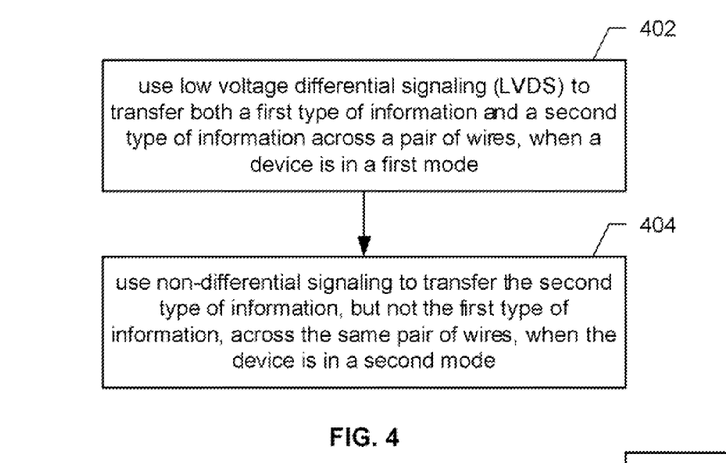
FIGS. 4 and 5 are high level flow diagrams that are useful for summarizing specific embodiments of the present invention.

As shown in FIG. 3, buffers 124 and 144 are provided to enable bi-directionality of slow speed data, impedance matching, and circuit isolation The high level flow diagram of FIG. 4 is useful for summarizing specific embodiments of the present invention that can be used, e.g., to reduce power consumption in a mobile device that has a first mode (e.g., an active mode) and a second mode (e.g., a sleep or standby mode). Referring to FIG. 4, at a step 402, low voltage differential signaling (LVDS) is used to transfer both a first type of information (e.g., high speed data and clock) and a second type of information (e.g., low speed I2C data and clock) across a pair of wires (e.g., 130), when the device is in the first mode (e.g., active mode). In contrast, as shown at step 404, non-differential signaling is used to transfer the second type of information (e.g., the low speed I2C data and clock), but not the first type of information (e.g., the high speed data and clock), across the same pair of wires (e.g., 130), when the device is in the second mode (e.g., sleep or standby mode).

In accordance with specific embodiments, at step 402, the pair of wires (e.g., 130) are used as a single differential pair, when the device is in the first mode (e.g., active mode). In contrast, at step 404, the pair of wires (e.g., 130) are used as two separate single-ended serial lines, when the device is in the second mode (e.g., sleep or standby mode).

Figure 5:
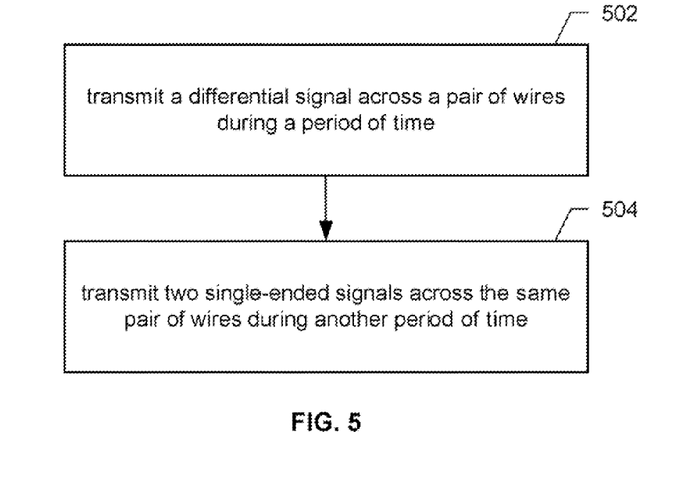

FIG. 5 is a high level flow diagram that also summarizes specific embodiments of the present invention. As shown in FIG. 5, at a step 502, a differential signal is transmitted across a pair of wires during a period of time; and at a step 504 two single-ended signals are transmitted across the same pair of wires during another period of time. As explained above, low voltage differential signaling (LVDS) can be used to transmit the differential signal across the pair of wires; and non-differential signaling can be used to transfer the two single-ended signals across the same pair of wires. As explained above, the pair of wires can be, but are not limited to, a twisted pair or a pair of conductive traces. In specific embodiments, step 502 can be performed when a device is in an active mode; and step 504 can be performed when a device is in a sleep or standby mode.

In FIG. 3 the transmitter 132 is shown as being associated with a host processor 102 that transmits video and control signals to a receiver 132 that is shown as being associated with a display driver 152. However, such an environment is only one exemplary environment in which embodiments of the present invention can be used. One of ordinary skill in the art would understand, from the above description, that embodiments of the present invention can be used in other environments where there is the desire to use a pair of wires for both high speed differential signaling and lower speed single-ended signaling. The reason for switching between the two types of signaling, as explained above, can be to reduce power consumption. However, there can be other reasons why this may be desired.

Figure 6:
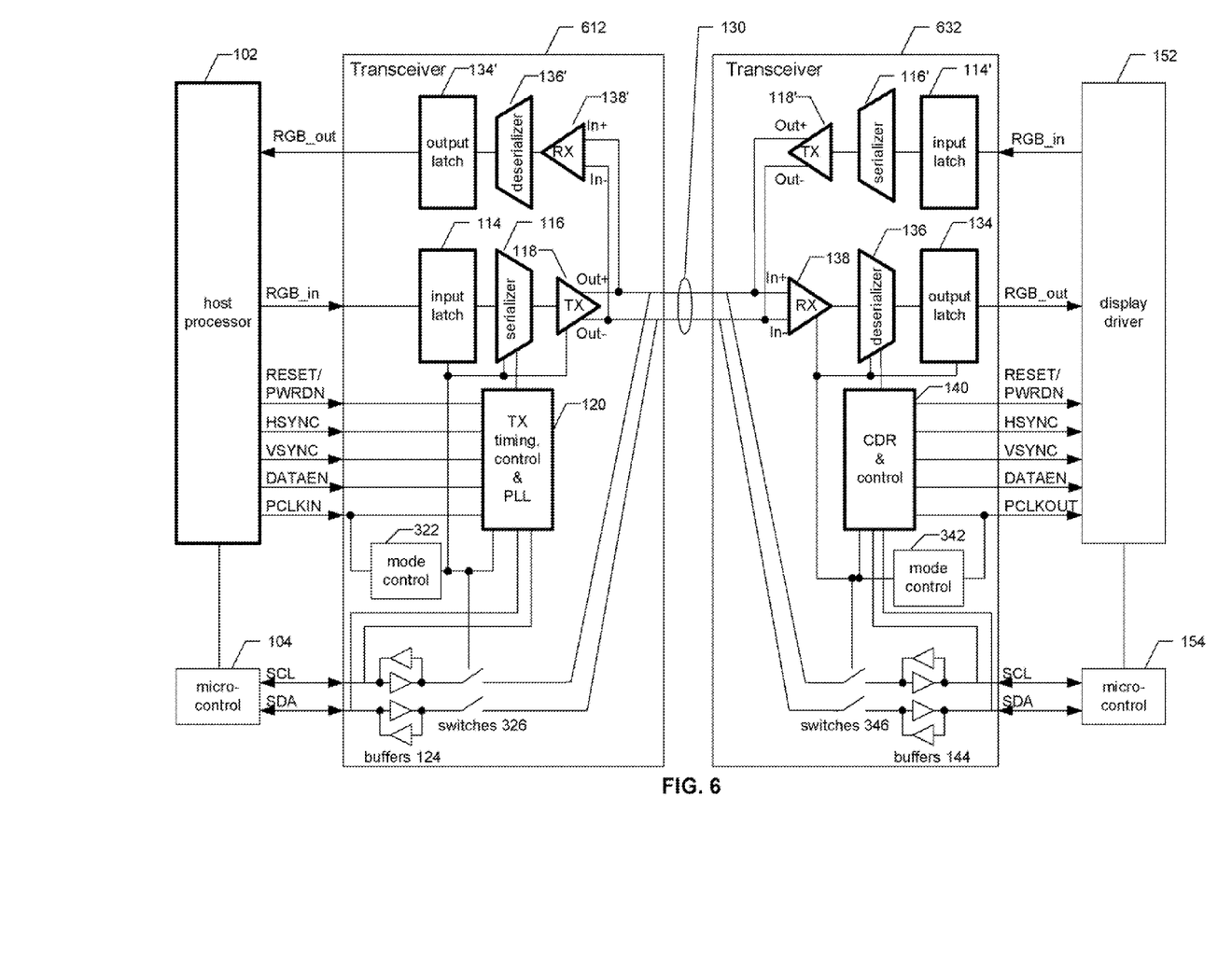
FIG. 6 is a high level block diagram illustrating how the transmitter and receivers of FIG. 3 can be portions of transceivers.

In FIG. 3, the transmitter 112 is shown as being in communication with the receiver 132. While not specifically shown in FIG. 3, the transmitter 112 can be part of a transceiver. Similarly, the receiver 132 can be part of another transceiver. An example of this is shown in FIG. 6. Although not shown, the transceiver 612 will likely also include a CDR and control block similar to 140; and the transceiver 632 will likely also include a transmit timing, control and PLL block similar to block 120. Also, while not specifically show in FIG. 6, many of the signals can be bi-directional where transceivers are used. In the embodiment shown, the transceivers provide for half-duplex communications of the SCL and SDA signals.

It is also possible that each transceiver includes a serializer/deserializer (SerDes) capable of full-duplex operation, meaning that data conversion can take place in both directions simultaneously. In such an embodiment, there wouldn't be a need for each transceiver to include a separate serializer and deserializer.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. It is intended that the scope of the invention be defined by the following claims and their equivalents.

What is claimed is:

1. A method for use by a transmitter, for transmitting signals from the transmitter across a pair of wires to a receiver, comprising:
   (a) monitoring for the presence or absence of a predetermined signal that is indicative of whether or not video signals are being provided to the transmitter for transmission to the receiver;
   (b) selecting one of a first mode of operation and a second mode of operation based on results of the monitoring for the presence or absence of the predetermined signal;
   (c) transmitting differential signals across the pair of wires during a period of time when the first mode of operation is selected based on results of the monitoring, wherein the differential signals include video signals as well as Inter-Integrated Circuit (I2C) signals embedded with the video signals, wherein the I2C signals include a serial clock signal (SCL) and a serial data signal (SDA); and
   (d) transmitting two single-ended signals across the same pair of wires during another period of time when the second mode of operation is selected based on results of the monitoring, wherein one of the two single-ended signals comprises the SCL I2C signal, the other one of the two single-ended signals comprises the SDA I2C signal, and neither of the two single-ended signals comprises a video signal.

2. The method of claim 1, wherein the predetermined signal, for which the presence or absence is being monitored for at step (a), comprises a signal that is selectively provided to the transmitter used for transmitting signals across the pair of wires.

3. The method of claim 1, wherein the predetermined signal comprises one of a data enable signal (DATAEN) and a processor clock signal (PCLK).

4. The method of claim 1, wherein step (b) comprises:
   (b.1) selecting the first mode of operation if the predetermined signal is detected; and
   (b.2) selecting the second mode of operation if the predetermined signal is not detected.

5. The method of claim 1, wherein:
   the first mode of operation is an active mode; and
   the second mode of operation is a sleep or standby mode.

6. The method of claim 5, wherein the sleep or standby mode is a reduced power mode as compared to the active mode.

7. A method for transmitting signals across a pair of wires, comprising:
   (a) monitoring for the presence or absence of a predetermined signal;
   (b) selecting one of a first mode of operation and a second mode of operation based on results of the monitoring for the presence or absence of the predetermined signal;
   (c) transmitting differential signals across the pair of wires during a period of time when the first mode of operation is selected based on results of the monitoring; and
   (d) transmitting two single-ended signals across the same pair of wires during another period of time when the second mode of operation is selected based on results of the monitoring;
   wherein at step (c) the differential signals being transmitted across the pair of wires comprise high speed signals as well as first and second low speed signals embedded with the high speed signals, wherein the high speed signals are transferred at a speed that is at least 1 MHz, and wherein the low speed signals are transferred at a speed of no more than 400 KHz; and
   wherein at step (d) one of the two single-ended signals being transmitted across one of the wires comprises the first low speed signal, and the other one of the two single-ended signals being transmitted across the other one of the wires comprises the second low speed signal, and neither of the two single-ended signals comprise the high speed signals.

8. A method for transmitting signals across a pair of wires, comprising:
   (a) monitoring for at least one of a data enable signal (DATAEN) and a processor clock signal (PCLK);
   (b) selecting one of a first mode of operation and a second mode of operation based on results of the monitoring;
   (c) transmitting differential signals across the pair of wires during a period of time when the first mode of operation is selected based on results of the monitoring; and
   (d) transmitting two single-ended signals across the same pair of wires during another period of time when the second mode of operation is selected based on results of the monitoring;
   wherein at step (c) the differential signals being transmitted across the pair of wires comprise high speed signals as well as first and second low speed signals embedded with the high speed signals, wherein the high speed signals are transferred at a speed that is at least 1 MHz, and wherein the low speed signals are transferred at a speed of no more than 400 KHz; and
   wherein at step (d) one of the two single-ended signals being transmitted across one of the wires comprises the first low speed signal, and the other one of the two single-ended signals being transmitted across the other one of the wires comprises the second low speed signal, and neither of the two single-ended signals comprise the high speed signals.

9. The method of claim 8, wherein step (b) comprises:
   (b.1) selecting the first mode of operation if the at least one of the data enable signal (DATAEN) and the processor clock signal (PCLK) is/are detected; and (b.2) selecting the second mode of operation if the at least one of the data enable signal (DATAEN) and the processor clock signal (PCLK) is/are not detected.

10. The method of claim 8, wherein:
the first mode of operation is an active mode; and
the second mode of operation is a sleep or standby mode.

11. The method of claim 10, wherein the sleep or standby mode is a reduced power mode as compared to the active mode.

12. A method for use by a circuit that is configured to transmit signals across a pair of wires to a further circuit, comprising:
   (a) monitoring for the presence or absence of a predetermined signal that is selectively provided to an input of the circuit and is indicative of whether video signals are being provided to the circuit for transmission to the further circuit;
   (b) selecting one of a first mode of operation and a second mode of operation for the circuit based on results of the monitoring for the presence or absence of the predetermined signal;
   (c) configuring the circuit to transmit differential signals across the pair of wires during a period of time when the first mode of operation is selected based on results of the monitoring for the presence or absence of the predetermined signal, wherein the differential signals include video signals as well as Inter-Integrated Circuit (I2C) signals embedded with the video signals, wherein the I2C signals include a serial clock signal (SCL) and a serial data signal (SDA); and
   (d) configuring the circuit to transmit two single-ended signals across the same pair of wires during another period of time when the second mode of operation is selected based on results of the monitoring for the presence or absence of the predetermined signal, wherein one of the two single-ended signals comprises the SCL I2C signal, the other one of the two single-ended signals comprises the SDA I2C signal, and neither of the two single-ended signals comprises a video signal.

13. The method of claim 12, wherein the predetermined signal comprises one of a data enable signal (DATAEN) and a processor clock signal (PCLK).

14. The method of claim 12, wherein the second mode of operation is a reduced power mode as compared to the first mode of operation.

15. The method of claim 14, wherein step (b) comprises:
   (b.1) selecting the first mode of operation if the predetermined signal is detected; and
   (b.2) selecting the second mode of operation if the predetermined signal is not detected.

16. A method for use by a circuit that is configured to transmit signals across a pair of wires, comprising:
   (a) monitoring for the presence or absence of a predetermined signal that is selectively provided to an input of the circuit;
   (b) selecting one of a first mode of operation and a second mode of operation for the circuit based on results of the monitoring for the presence or absence of the predetermined signal;
   (c) configuring the circuit to transmit differential signals across the pair of wires during a period of time when the first mode of operation is selected based on results of the monitoring for the presence or absence of the predetermined signal; and
   (d) configuring the circuit to transmit two single-ended signals across the same pair of wires during another period of time when the second mode of operation is selected based on results of the monitoring for the presence or absence of the predetermined signal;
   wherein at step (c) the differential signals being transmitted across the pair of wires comprise high speed signals as well as first and second low speed signals embedded with the high speed signals, wherein the high speed signals are transferred at a speed that is at least 1 MHz, and wherein the low speed signals are transferred at a speed of no more than 400 KHz; and
   wherein at step (d) one of the two single-ended signals being transmitted across one of the wires comprises the first low speed signal, and the other one of the two single-ended signals being transmitted across the other one of the wires comprises the second low speed signal, and neither of the two single-ended signals comprise the high speed signals.

17. A mode controller configured to control how transmitter circuitry transmits signals across a pair of wires, wherein the mode controller is configured to:
   determine whether a predetermined signal is detected at a predetermined terminal, wherein detection of the predetermined signal at the predetermined terminal is indicative of whether video signals are being provided to the transmitter circuitry for transmission to receiver circuitry;
   select one of a first mode of operation and a second mode of operation based on whether the predetermine signal is detected at the predetermined terminal;
   configure the transmitter circuitry to transmit differential signals across the pair of when the first mode of operation is selected, wherein the differential signals include video signals as well as Inter-Integrated Circuit (I2C) signals embedded with the video signals, wherein the I2C signals include a serial clock signal (SCL) and a serial data signal (SDA); and
   configure the transmitter circuitry to transmit two single-ended signals across the same pair of wires when the second mode of operation is selected, wherein one of the two single-ended signals comprises the SCL I2C signal, the other one of the two single-ended signals comprises the SDA I2C signal, and neither of the two single-ended signals comprises a video signal.

18. The mode controller of claim 17, wherein the predetermined signal comprises one of a data enable signal (DATAEN) and a processor clock signal (PCLK), and wherein the predetermined terminal comprises an input terminal configured to accept the one of the data enable signal (DATAEN) and the processor clock signal (PCLK).

19. The mode controller of claim 17, wherein the second mode of operation is a reduced power mode as compared to the first mode of operation.

20. A system, comprising:
   transmitter circuitry configured to transmit signals across a pair of wires connected to a pair of outputs of the transmitter circuitry; and
   a mode controller configured to control how the transmitter circuitry transmits signals across the pair of wires;
   wherein the mode controller is configured to
   determine whether a predetermined signal is detected at a predetermined terminal;
   select one of a first mode of operation and a second mode of operation based on whether the predetermine signal is detected at the predetermined terminal;
   configure the transmitter circuitry to transmit differential signals across the pair of when the first mode of operation is selected; and configure the transmitter circuitry to transmit two single-ended signals across the same pair of wires when the second mode of operation is selected, wherein detection of the predetermined signal at the predetermined terminal is indicative of whether video signals are being provided to the transmitter circuitry for transmission to receiver circuitry;

wherein the differential signals include video signals as well as Inter-Integrated Circuit (I2C) signals embedded with the video signals, wherein the I2C signals include a serial clock signal (SCL) and a serial data signal (SDA); and wherein one of the two single-ended signals comprises the SCL I2C signal, the other one of the two single-ended signals comprises the SDA I2C signal, and neither of the two single-ended signals comprises a video signal.

21. The system of claim 20, wherein the predetermined signal comprises one of a data enable signal (DATAEN) and a processor clock signal (PCLK), and wherein the predetermined terminal comprises an input terminal configured to accept the one of the data enable signal (DATAEN) and the processor clock signal (PCLK).

22. The system of claim 20, wherein the second mode of operation is a reduced power mode as compared to the first mode of operation.

23. The method of claim 1, wherein the transmitter is part of a first transceiver and the receiver is part of a second transceiver.

24. The mode controller of claim 17, wherein the transmitter circuitry is part of a transceiver.

* * * * *